United States Patent [19]

Kuwayama et al.

[11] Patent Number: 4,973,077

[45] Date of Patent: Nov. 27, 1990

[54] STABILIZER DEVICE FOR MOTOR VEHICLES

[75] Inventors: Kiyoaki Kuwayama; Katsumi Hirabayashi, both of Nagoya, Japan

[73] Assignee: Chuo Hatsujo Kabushiki Kaisha, Aichi, Japan

[21] Appl. No.: 509,304

[22] Filed: Apr. 13, 1990

[30] Foreign Application Priority Data

May 31, 1989 [JP] Japan ................................. 1-135975

[51] Int. Cl.$^5$ .............................................. B60G 21/02
[52] U.S. Cl. .................................... 280/689; 280/707;
267/186; 267/277; 267/34; 188/322.14;
188/322.15; 188/318
[58] Field of Search ............... 280/721, 723, 689, 707;
267/186, 187, 190, 191, 121, 34, 273, 277, 154;
188/322.14, 317, 318, 322.15

[56] References Cited

U.S. PATENT DOCUMENTS 4,805,929 2/1989 Shibata et al. ....................... 280/721

FOREIGN PATENT DOCUMENTS

| 537375 | 2/1957 | Canada | 188/317 |
| 178414 | 8/1987 | Japan | 188/318 |
| 20210 | 1/1988 | Japan | 188/318 |
| 257614 | 10/1989 | Japan | 267/186 |

Primary Examiner—Richard A. Bertsch
Assistant Examiner—Karin Tyson
Attorney, Agent, or Firm—Koda & Androlia

[57] ABSTRACT

Stabilizer device for motor vehicles including a torsion bar, an actuator having a piston and two cylinder chambers on both sides of piston, a first and a second fluid passages for connecting said two cylinder chambers, respectively, a solenoid changeover valve provided in first fluid passage. A actuator has two openings for communicating with each end of first fluid passage within an area on which piston may not slidably contact. A plate member and a centering spring are provided within each of cylinder chambers in such a manner that each of plate members is to come in contact with a bottom surface of cylinder slightly by virtue of resilience of centering spring when piston is positioned in a neutral position. An opening is provided in each of bottom surface of cylinder chambers within an area on which plate member is to come in contact therewith. Each of openings is communicated with second fluid passage and a check valve may be mounted in each of openings.

Relative movement of torsion bar with a body portion of the vehicle resulted from up-and-down motion of wheels is transmitted to piston through a piston rod. During changeover valve allows flow of fluid flowing first fluid passage between cylinder chambers, anti-roll, anti-dive and anti-squat effects of torsion bar are made ineffective. When changeover valve prohibits flow of fluid in first fluid passage, fluid is trapped in both cylinder chambers, therefore, anti-roll or anti-dive and anti-squat effects of torsion bar are made effective. Fluid is allowed to flow from one cylinder chamber to another cylinder chamber through second fluid passage, then finally piston is positioned at neutral position.

6 Claims, 13 Drawing Sheets 4,973,077

STABILIZER DEVICE FOR MOTOR VEHICLES

BACKGROUND OF THE INVENTION

1. Field of the Invention

This invention relates to a torsion bar-type stabilizer device used in a suspension system of a motor vehicle and, more particularly, to a stabilizer device capable of controlling the torsional rigidity of a torsion bar according to vehicle driving conditions.

2. Description of the Prior Art

In the suspension system of a motor vehicle, there is commonly used a stabilizer device which uses a torsion bar having a spring-action section extending in the direction of width of vehicle and rotatably supported on the vehicle body side by a part of the torsion bar, and a mounting level portion bent, at both ends of the spring-action section, in the longitudinal direction of the vehicle, and secured at a free end thereof on the right and left wheel sides. The use of this stabilizer device improves the rigidity of the suspension system against the rolling of the vehicle by utilizing the elastic force of the torsion bar produced by torsion that has occurred in the spring-action section of the torsion bar when the right and left wheels make an up-and-down motion, thus achieving vehicle driving stability.

In high-speed driving vehicles or off-road driving vehicles, it is desirable to increase the spring constant of the torsion bar for the purpose of improving the rolling resistance of the vehicle. If, however, the spring constant is increased, the right and left wheels are likely to make incessant anti-phase up-and-down motion, resulting in lowered driving comfort. To cope with this drawback, there has been proposed a stabilizer device (for example in Laid-Open Japanese Utility Model Registration Application [KOKAI] No. 63-40214 and Laid-Open Japanese Patent Application [KOKAI] No. 63-137009), in which the stabilizer device mounting section on the wheel side or on the vehicle body side comprises a cylinder provided on the torsion bar or on either of a member on the wheel side or a member on the vehicle body side, a piston rod of a piston secured on the other side and the piston separating the interior of the cylinder into two chambers; openings provided in the wall of the cylinder and located in positions corresponding to a neutral position of the piston in the cylinder and to the ends of the two cylinder chambers; a closed circuit formed for connecting the fluid passage communicating with these openings to an accumulator, and filled with a fluid; and a solenoid valve or an operation check valve provided in a passage connecting the fluid passage to the two cylinder chambers, and controllable from the driver's seat. When the solenoid valve or the operation check valve is operated to allow the free passage of the fluid between the two cylinder chambers, the piston makes a free relative motion relative to the cylinder if the up-and-down motion of the wheels is transmitted to the piston rod, and accordingly the torsion resulting from the up-and-down motion of the wheels will not occur in the spring-action section, thus making ineffective the action of the stabilizer device. When the solenoid valve is operated to stop the passage of the fluid, or when the operation check valve is operated to allow the unidirectional flow of the fluid, the movement of the fluid between the two cylinder chambers is checked, preventing the relative movement of the piston relative to the cylinder and accordingly causing a torsion resulting from the up-and-down motion of the wheels to arise in the spring-action section and an anti-roll affect by the torsion bar to occur.

In these devices, the cylinder has an opening for communicating one of the cylinder chambers with a fluid passage having an opening in a position corresponding to the neutral position of the piston for communicating one of the cylinder chambers with an accumulator through a fluid passage. The fluid in the cylinder chamber flows into the accumulator through the opening if the piston stops in an arbitrary position when the operation check valve or the solenoid valve is operated for locking the piston to prevent the free relative movement of the piston relative to the cylinder. Into the other cylinder chamber, the fluid is admitted to flow by the operation check valve functioning as a check valve, or by a substitute check valve, which allows the movement of the piston to the neutral position. When the piston arrives at its neutral position, the piston closes the opening in the cylinder corresponding to the neutral position in the cylinder chamber. At this time, the relative movement of the piston relative to the cylinder is fully stopped, thereby exerting the torsional rigidity of the torsion bar during anti-roll action equally to both the right and left wheels.

According to the prior-art stabilizer device described above, the cylinder is provided with an opening communicating with the accumulator, in a position corresponding to the neutral position of the piston, in order to hold the piston in the neutral position in the cylinder during the anti-roll action of the stabilizer device. In this device of above-described constitution, the piston is allowed to move to the neutral position regardless of the present piston position at the time when the movement of the fluid between the two cylinder chambers has been checked by the solenoid valve or the operation check valve. When the piston closes the opening located in a position corresponding to the neutral position of the piston, the movement of the fluid is checked to lock the piston, thus preventing the relative movement of the piston in relation to the cylinder.

For closing the opening with the piston itself, either in a device having a reciprocating piston in which piston rod moves in the axial direction of the cylinder or in a device having a rotary piston in which a piston rod turns around the center of axis of the cylinder, it is not easy to maintain fluid-tightness between the piston and the cylinder and accordingly it is very difficult to hold the piston in the locked position. For example, the use of a piston seal produced of a soft elastic material presents an increased danger of shearing of the piston seal by an edge of the opening. Also, the use of a piston seal of rigid synthetic resin or metal produces a gap between the piston and the cylinder inner wall, through which the fluid will leak, resulting in a failure of piston locking.

SUMMARY OF THE INVENTION

It is an object of this invention to provide a stabilizer device which holds a piston exactly in a neutral position without providing any opening in a cylinder in a position corresponding to the neutral position of the piston, and accordingly an optional elastic seal can be used between the piston and the cylinder.

The stabilizer device of this invention relates an improvement of a stabilizer device for a motor vehicle, which has a torsion bar including a central spring section which extends in the direction of width of the vehicle and functions as a spring and a lever mounting section bent in the longitudinal direction of the vehicle at both ends of the central spring section, with either one of the central spring section and the lever mounting section of the torsion bar being mounted to a mounting member on the vehicle body side and the other being mounted to a mounting member on the wheel side. Between at least one of the mounting member on the vehicle body side and the mounting member on the wheel side and the torsion bar section which makes a relative movement in relation to the mounting members resulted from up-and-down motion of the wheels, there are provided an actuator comprising a cylinder, a piston which is slidably movable in the cylinder and separates the interior of the cylinder into two cylinder chambers, and a piston rod for transmitting the said relative motion between the torsion bar and the mounting member into the relative motion of the piston in relation to the cylinder; a closed circuit consisting of fluid passages including a couple of first fluid passages communicated at one end thereof to one of the two cylinder chambers of the actuator, respectively, and filled with the fluid; and a changeover means for switching between a state in which the fluid can freely flow between the two first fluid passages provided in the closed circuit and a state in which the flow of the fluid is stopped.

In this invention, a centering spring is provided in each cylinder chamber in order to center the piston in the neutral position when the actuator piston is locked by stopping the flow of the fluid between the first fluid passages at an optional time by the changeover means. In the actuator cylinder is inserted a piston to which a relative motion corresponding to the up-and-down motion of the wheels is given through a piston rod, changing a distance between each piston wall surface facing the cylinder chamber and the cylinder wall surface in respect to the direction of movement of the piston. On one of the piston wall surface and the cylinder wall surface is secured one end of the centering spring. The other end of the centering spring is fixed on a plate-like member which is smaller than the other cylinder wall surface in shape and size. The plate-like member is pressed by the elastic force of the centering spring into contact with the said other wall surface.

In the other wall surface previously stated is provided an opening of one end of the second fluid passage within an area in which the plate-like member should come in contact with the wall surface. This second fluid passage forms a part of the closed circuit. In this opening, a check valve is disposed. This check valve is constituted such that a valve body of the check valve moves off a valve seat by the elastic force of a return spring, with a part of the valve body being constantly forced to project out of the opening of the second fluid passage, and that the valve body comes to be seated on the valve seat when pressed against the elastic force of the return spring along the direction of movement of the piston, thus closing the second fluid passage. The plate-like member is pressed by the centering spring to push the valve body of the check valve towards the direction for closing the check valve. The centering springs in this state apply the spring force to both the piston wall surfaces, thus moving the piston to the neutral position. The spring force of the return springs of the check valve is set to be a little less than that of the centering springs when the piston is in the neutral position where the spring force of the centering springs is balanced.

According to this invention, when the fluid is allowed by the changeover means to flow freely between the first fluid passages one end of which opens in the respective cylinder chamber of the actuator, respectively, the relative movement between the torsion bar and the mounting member is transmitted to the relative movement of the piston against the cylinder. Thus, the fluid in one of the cylinder chambers flows into the other cylinder chamber through the first fluid passages when one of the cylinder chambers is contracted. Accordingly the piston receives only the resistance, or elastic force, of the centering springs, and moves freely in the cylinder. Therefore, there will not take place any torsion resulting from the up-and-down motion of the wheels in the central spring section of the torsion bar, consequently making ineffective anti-roll effect, anti-dive effect, and anti-squat effect of the stabilizer device.

When the fluid flowing between the first fluid passages is stopped by the changeover means, the fluid is shut up in the two cylinder chambers of the actuator. If, at this time, the actuator piston is in the neutral position in which the centering spring force in the cylinder chambers is balanced, the spring force of the check valve return spring is less than that of the centering spring, and accordingly the second fluid passage is closed by the check valve. Because, at this time, the fluid in each cylinder chamber is fully shut in, the piston is locked in the neutral position. If the piston is off on either side from the neutral position when the first fluid passage is blocked by the changeover means, one of the centering springs in both the cylinder chambers has a great degree of compression and a great spring force, while the other centering spring has a lower degree of compression and a less spring force in compared with those of the springs when the piston is in the neutral position. The spring force of this centering spring having the low degree of compression decreases lower than the spring force the return spring of the check valve which is in contact with the plate-like member being pressed by this centering spring. In this state this check valve loses its function, allowing the fluid to flow from the cylinder chamber which has the centering spring of a low compression, to the second fluid passage. In the meantime, the check valve on which the plate-like member is contacted with and pressed by the centering spring with a great compression maintains its function, allowing only the stream of the fluid flowing in the direction from the second passage to the cylinder chamber. The piston is allowed to move until the spring force of both the centering springs is balanced. When the piston has moved as far as the neutral position, the check valve recovers its function, and accordingly the piston is locked in the neutral position.

When the piston is locked in the neutral position in the cylinder, the mounting member and the part of the torsion bar which is connected with the said mounting member through the actuator makes no relative movement and, accordingly, in the central spring section of the torsion bar, there occurs torsion resulting from the up-and-down motion of the wheels, making effective the anti-roll effect or the anti-dive effect and the anti-squat effect of the stabilizer device.

According to this invention, as described above, the action of the torsion bar for restricting a change in vehicle stance during driving can readily be necessitated or unnecessitated simply by closing or opening the first fluid passages by the changeover means. Also when the flow of the fluid between the first fluid passages is stopped by the changeover means, a change in vehicle stance can be restrained by the second fluid passage and by the action of check valve and centering spring regardless of the piston position in the actuator, and further permitting the piston to return nearly to its neutral position in the cylinder. Thereafter the piston is held in the position. Accordingly the stabilizer device as a stabilizer for motor vehicles can provide constant driving stability. In addition, because the opening of the second fluid passage in the actuator is formed in the piston wall surface facing each cylinder chamber or in the cylinder wall surface facing the piston wall surface in the direction of movement of the piston, the piston is not slid across this opening. Therefore, a seal produced of a soft, elastic material can be used on a sliding surface of the piston sliding on the cylindrical wall surface, to keep fluid-tightness between the sliding surfaces, thereby effectively preventing the seepage of the fluid between the cylinder chambers. Therefore it is possible to improve the position and stability of the piston and the piston rod during the anti-roll, anti-dive and anti-squat actions of the torsion bars and to prolong the life of the piston seal.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
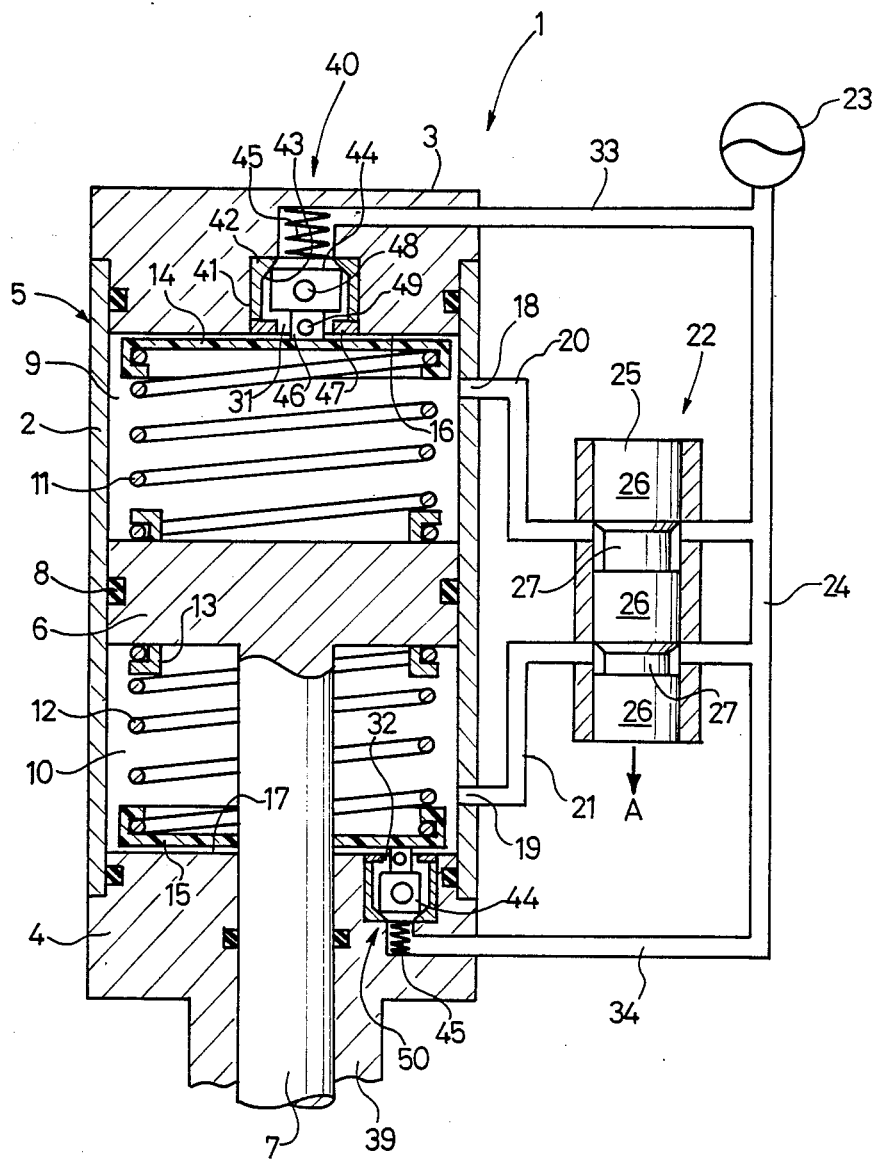
FIGS. 1 and 2 are sectional views of major portions each showing an operating condition of an actuator and a changeover means according to a first embodiment of this invention, respectively.
Figure 2:
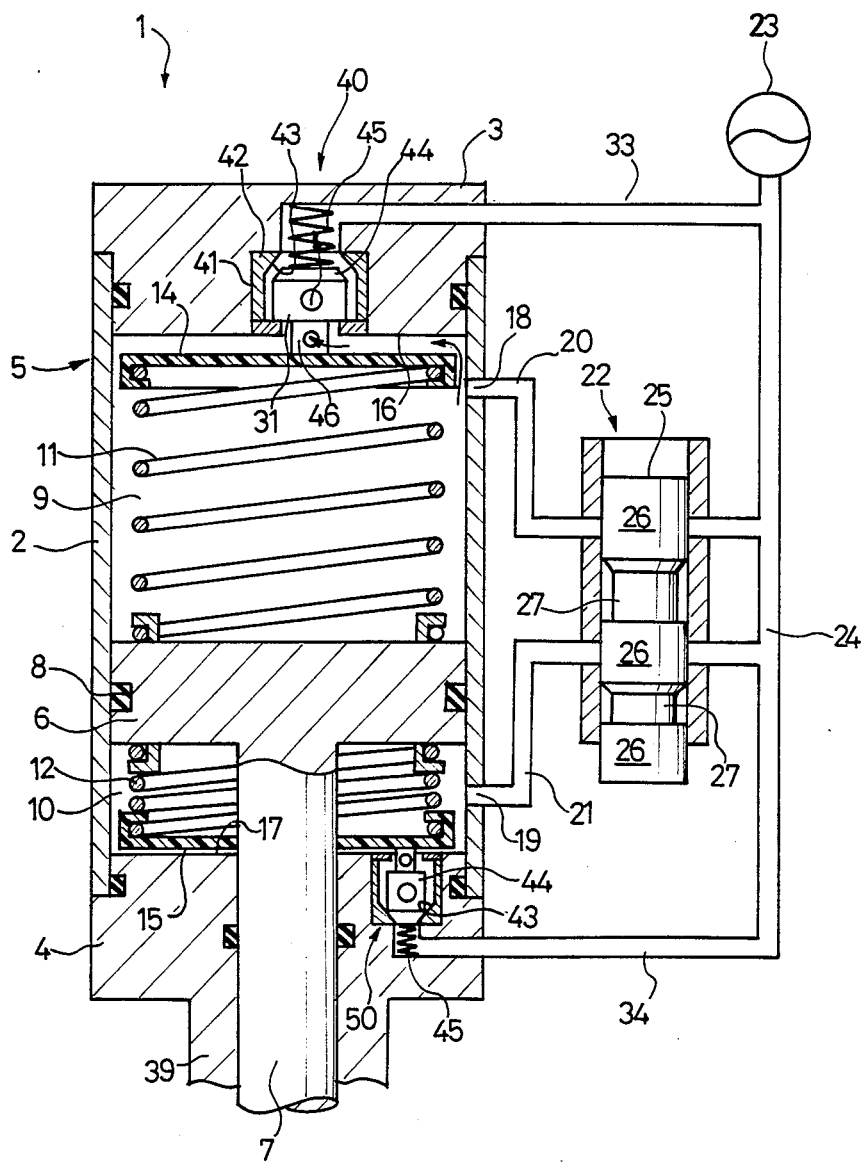

FIG. 1 is a sectional view showing a major portion of an actuator, and a solenoid changeover valve as a changeover means according to the first embodiment of this invention. FIG. 2 is a sectional view showing the actuator and the changeover means in operation.

The actuator 1 comprises a cylinder 5 having disk-like end plates 3 and 4 secured fluid-tightly at both ends in the axial direction of a tublar outer cylinder 2, a piston 6 slidable along the inner peripheral surface of the outer cylinder 2 and movable in the axial direction of the outer cylinder 2, and a piston rod 7 installed fluid-tightly through the end plate 4 along the center axis of the outer cylinder 2 and connected with the piston 6 at one end thereof. The piston 6 is provided with a peripheral groove cut in the outer peripheral surface thereof, in which a seal ring 8 produced of a soft, elastic material is fitted to maintain fluid-tightness between the piston 6 and the inner wall of the outer cylinder 2, thereby separating the interior of the cylinder 5 into a couple of cylinder chambers 9 and 10.

In each of the cylinder chambers 9 and 10 separated by the piston 6, it is disposed centering springs 11 and 12 formed in a coil-spring form, respectively. One end of each of the springs 11 and 12 is concentrically secured by several L-shaped fittings 13, 13 to the piston wall surface facing the cylinder chambers 9 and 10, respectively. The other ends of the springs 11 and 12 are each secured to one surface of the plate-like members 14 and 15 produced of a rigid synthetic resin, respectively, such that, in the direction of movement of the piston 6, each of a flat plate sections formed on the other surface of the plate-like members 14 and 15 will come in contact with the wall surfaces of the end plates 3 and 4 which constitute the cylinder wall surfaces 16 and 17 facing the piston wall surface on which one end of each of the springs 11 and 12 is fixedly secured.

In the outer cylinder 2 are formed openings 18 and 19 in positions outside the range of slide of the piston 6 where the openings will not be closed by the piston 6. First fluid passages 20 and 21 communicating with these openings 18 and 19, respectively, are connected a main fluid passage 24 communicating with an accumulator 23 through the solenoid changeover valve 22. In the cylinder wall surface 16 of the end plate 3 is formed an opening 31. Also in the cylinder wall surface 17 of the end plate 4 is formed an opening 32. These openings 31 and 32 are connected to the main fluid passage 24 by the second fluid passages 33 and 34. The cylinder chambers 9 and 10, the first fluid passages 20 and 21, the second fluid passages 33 and 34, the main fluid passage 24 and the accumulator 23 are filled with the fluid, and applied with a slightly higher pressure than the atmospheric pressure by the accumulator 23, all forming a closed circuit. A valve body 25 is connected to a solenoid (not shown) of the solenoid changeover valve 22. This valve body 25 has two annular grooves 27 cut in the outer peripheral surface between three lands 26 arranged in the axial direction. When the valve body 25 slides until the annular grooves 27 allows to communicate the first fluid passages 20 and 21 with the main fluid passage 24, the first fluid passages 20 and 21 are communicated with each other, allowing the free flow of the fluid from one of the cylinder chamber 9 and 10 to the other. Also, when the lands 26 of the valve body 25 block communication of the first fluid passages 20 and 21 with the main fluid passage 24, the flow of the fluid between the first fluid passages 20 and 21 is not permitted.

In the end plate 3 and between the opening 31 and the second fluid passage 33, there is provided a check valve 40 which connects and disconnects the opening 31 to and from the second fluid passage 33. This check valve 40 comprises a tublar valve cylinder 42 mounted fluid-tight in a cylindrical bore 41 open in the cylinder wall surface 16 of the end plate 3 and forming the opening 31 in the cylinder wall surface 16; a valve body 44 inserted in the valve cylinder 42 and seated on an annular valve seat 43 which is formed at the bottom of the valve cylinder 42; and a return spring 45 which is inserted in a small-diameter bore formed in the end wall 3 concentrically with the cylindrical bore 41 and connecting round bore of the valve seat 43 with the second fluid passage 33, and acts to move the valve body 44 away from the valve seat 43. The valve body 44 has a large-diameter section with a conical valve head which seats on the valve seat 43 and a small-diameter end section 46 provided coaxially with a large-diameter section. The free end of the small-diameter end section 46 extends into the opening 31, being flush with the cylinder wall surface 16 or projecting by a small size out from the wall surface 16 into the cylinder chamber 9 at the time when the valve body 44 is seated on the valve seat 43. In FIG. 1, numeral 47 denotes an annular stopper which supports the large-diameter section of the valve body 44 on which the conical valve head is formed. The annual stopper 47 is fixed at the end section of the valve cylinder 42 after the valve body 44 has been inserted into the valve cylinder 42, and its inner bore forms the opening 31. Numerals 48 and 49 are through holes each formed in a direction of a diameter of the large-diameter section and the small-diameter section having openings on the peripheral surfaces of the said sections. These through holes communicate with each other, helping the fluid flow between the second fluid passage 33 and the cylinder chamber 9 via the check valve 40.

In the end wall 4 is formed a check valve 50 for connecting and disconnecting the opening 32 to and from the second fluid passage 34. The constitution of this check valve 50 is the same as that of the check valve 40 provided in the end wall 3. In the drawing, therefore, the same reference numeral as that of the check valve 40 is used in the same major portion, the description of which, therefore, is not given.

In the check valves 40 and 50, the annular stopper 47 may be substituted by a plurality of (e.g., four) lugs formed integrally with the valve cylinder 42. The lugs originally project in the axial direction of the cylinder and are bent inwardly in the radial direction of the valve cylinder 42 after the insertion of the valve body 44 into the valve cylinder 42 to form stoppers. In this case, as the fluid flows between the stoppers, there is no necessity of providing the valve body 44 having the through holes 48 and 49.

Figure 8:
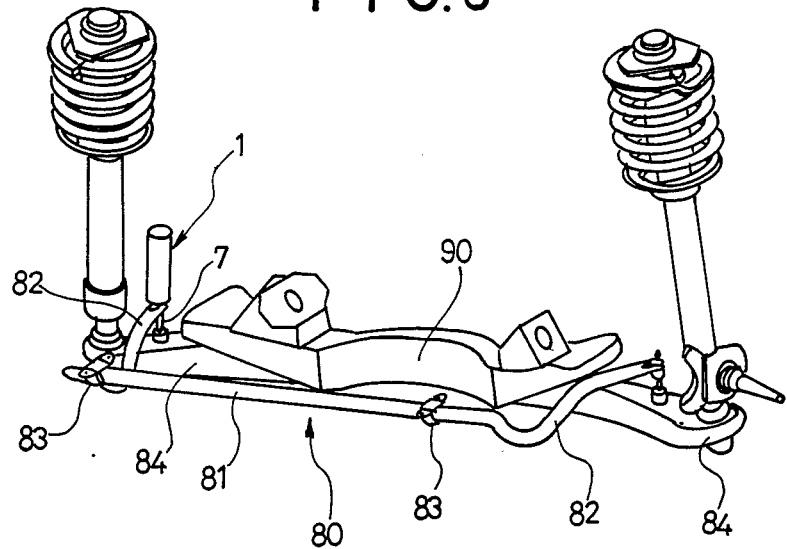
FIGS. 8 to 10 are perspective views of a major portion of the embodiment of this invention each showing different mounting positions of the actuator, respectively.
Figure 9:
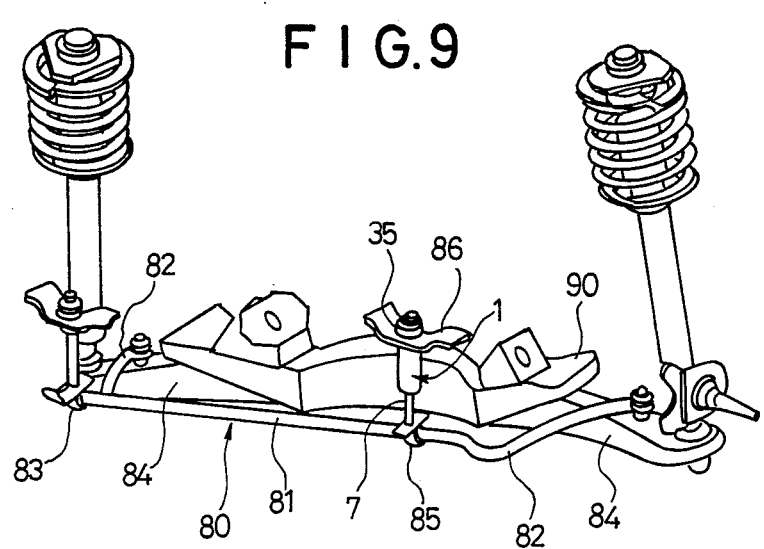
Figure 10:
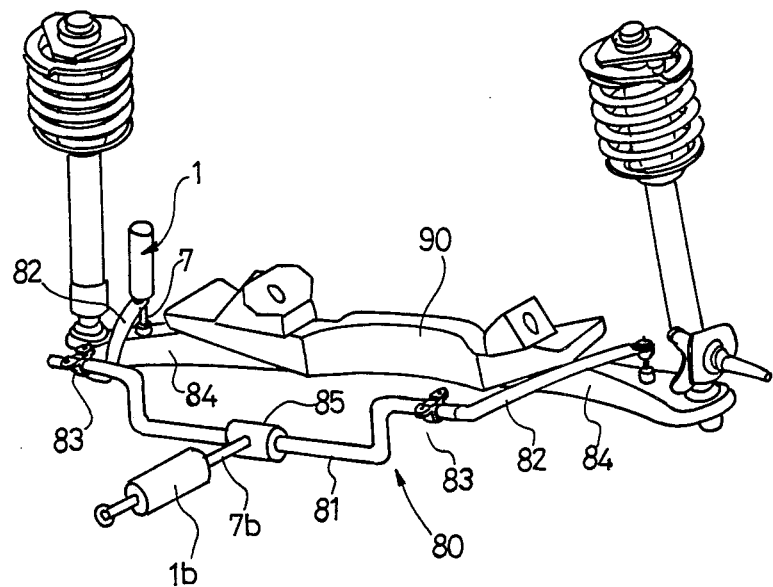

The actuator 1 of the above-described constitution is used as a stabilizer device for motor vehicles together with a torsion bar 80 as shown in FIGS. 8 to 10.

FIG. 8 shows an example of the stabilizer device for motor vehicle in which the actuator 1 in accordance with this invention is disposed between one of suspension arms 84 and one of the free end of torsion bar 80. In the stabilizer device, the torsion bar 80 has a central spring section 81 which acts as a straight torsional spring extending in the direction of width of the vehicle and lever-like mounting portions 82 bent at both ends of the central springs section 81 in the longitudinal direction of the vehicle. The torsion bar 80 is rotatably supported to mounting members (not shown) on the vehicle body side by means of support members 83 in the vicinity of both ends of the central spring section 81, and the free end of the lever-like mounting portions 82 is fixedly installed to the suspension arm 84 which is a supporting member of a wheel for a strut-type suspension system for the vehicle. In the example, the torsion occurring in the central spring section 81 of the torsion bar 80 acts on the piston rod 7 of the actuator 1 when the right and left wheels (not shown) supported by the strut-type suspension system are moving up and down with different phases. Numeral 90 represents the structural part of the vehicle body.

Figure 3:
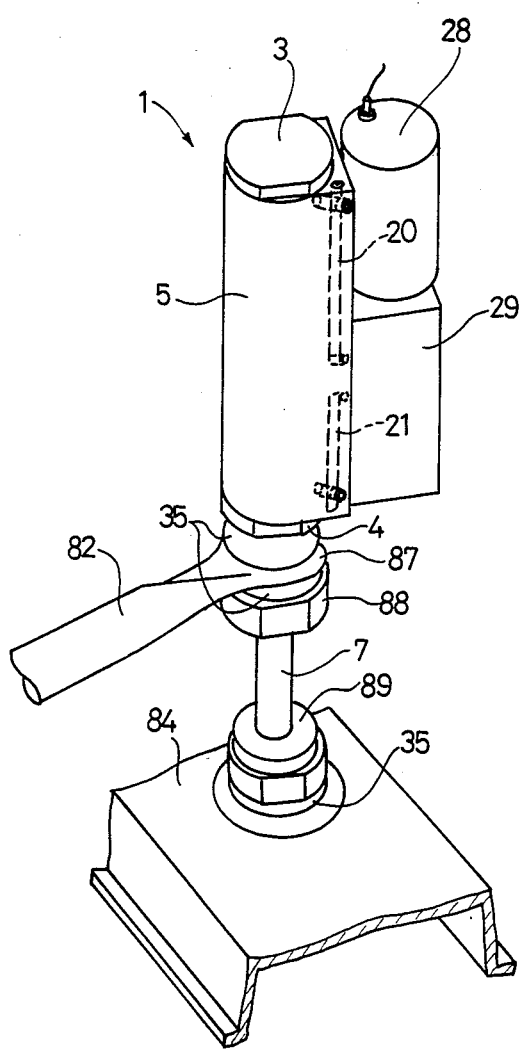
FIG. 3 is a perspective view showing a mounted condition of a stabilizer device according to the embodiment shown in FIG. 1.

FIG. 3 shows the outside appearance of the actuator 1 of this invention mounted between the suspension arm 84 and the free end of one of the lever-like mounting portions 82 of the torsion bar 80 as described above. On one side of the outer peripheral surface of the cylinder 5 is fixedly mounted at box 29 containing the solenoid changeover valve 22 and the accumulator 23 and a solenoid 28 for driving the valve 22. One end of the cylinder 5 by which the piston arm 7 is supported is inserted in an eye 87 formed in the free end of the lever-like mounting portion 82 through a rubber bushing 35 and fastened by a nut 88. The free end of the piston rod 7 is secured to the suspension arm 84 through a stopper cushion 89 and a rubber bushing 35. In FIGS. 1 and 2, numeral 39 indicates an extension of the end plate 4 for fastening thereof to the eye 87 by the nut 88.

FIG. 9 shows an example of installation of the actuator 1 with the movement of the piston rod 7 thereof extended in the vertical direction, in which the central spring section of the torsion bar 80 is supported by only one support member 83 to the mounting member on the vehicle side at the mounting position of one of the support member 83 of the example shown in FIG. 8 is positioned; the end of the piston rod 7 of the actuator 1 according to this invention is rotatably supported by the mounting member 85 at the mounting position of the other support member 83 of the example shown in FIG. 8 is positioned. One end of the cylinder 5 of the actuator 1 is supported to a mounting member 86 through the rubber bushing 35. For other parts which are the same as those appearing in FIG. 8, the same reference numerals are used. In this example, when the right and left wheels (not shown) supported by the strut -type suspension system make up-and-down motion, the central spring section 81 of the torsion bar 80 also moves up and down in the vertical direction at the portion of the mounting member 85, and this up-and-down motion acts on the piston rod 7 of the actuator 1.

FIG. 10 shows an example of installation of the stabilizer device for motor vehicles shown in FIG. 8, in which the central spring section 81 of the torsion bar 80 located between the two support members 83 is bent in a U-shape and vertically downwardly off from the center of support of the support member 83 and an actuator 1b according to this invention is additionally provided to the central portion 81 thereof. Free end of a piston rod 7b of the actuator 1b is rotatably pivoted by the mounting member 85, the actuator 1b is extended horizontally in the direction of longitudinal movement of the piston rod 7b, and rotatably mounted to a bifurcated portion of the mounting member 86 fixed to the vehicle side. The same reference numeral are used for the same parts as those used in FIG. 8. In this example, when the right and left wheels (not shown) supported by the strut-type suspention system make up-and-down motion, the central spring section 81 of the torsion bar 80 positioning between the two support members 83 is subjected to horizontal longitudinal movement with respect to the pivotal center of the support member 83 at rotational center, and this longitudinal motion acts on the piston rod 7b of the actuator 1b.

In FIG. 1, the valve body 25 of the solenoid changeover valve 22 is in the first position, in which the first fluid passages 21 and 22 are communicate with the main fluid passage 24 via the annular grooves 27. When the piston rod 7 makes a movement relative to the cylinder 5 resulting free movement of the piston 6 into the cylinder 5, because the fluid is allowed to flow into the main fluid passage 24 through the first fluid passages 21 and 22 with the volumetric change of the cylinder chambers 9 and 10. Accordingly, with the free movement of the piston 6, the piston rod 7 makes a free axial movement relative to the cylinder 5.

When the solenoid of the changeover valve 22 is energized to move the valve body 25 into the direction of the arrow A shown in FIG. 1, to disconnect the first fluid passage 20 and 21 from the main fluid passage 24, the fluid in both the cylinder chambers 9 and 10 is trapped in the cylinder chambers 9 and 10.

FIG. 2 shows the piston 6 in the second position in which the piston has moved downwardly of the drawing, with the valve body 25 shutting off the fluid flowing between the first fluid passages 20 and 21 and the main fluid passage 24. In the state illustrated, the cylinder chamber 10 is contracted in volume, and the center spring 12 in the cylinder chamber 10 is in a contracted position, pressing the plate-like member 15 with a great elastic force against the cylinder wall surface 17 of the end plate 4 to close the opening 31 formed in the end plate 4, or pressing the valve body 44 of the check valve 50 provided in the end plate 4 on the valve seat 43 against the elastic force of the return spring 45, and accordingly disconnecting the cylinder chamber 10 from the second fluid passage 34. Therefore, the fluid is fully shut in the cylinder chamber 10 by the above-mentioned disconnection and also because of the fluid-tightness of the seal ring 8 installed in the pripheral groove formed on the pripheral outer surface of the piston 6. In consequence, even when the movement of the central spring member 81 of the torsion bar 80 caused by the up-and-down motion of the right and left wheels is trasmitted to the piston 6 through the piston rod 7, the movement of the piston rod 7 towards further decreasing the volume of the cylinder chamber 10 is prevented by the incompressibility of the fluid. In the meantime, since the distance between the piston 6 and the cylinder wall surface 16 of the end plate 3 increases, the centering spring 11 disposed in the cylinder chamber 9 is largely extended. Therefore, the elastic force of this centering spring 11 for pressing the plate-like member 14 to the cylinder surface 16 of the end plate 3, or for pressing the valve body 44 of the check valve 40 disposed in the end plate 3 in a direction in which the valve body 44 is seated on the valve seat 43 has been extremely weakened, and therefore the elastic force of the return spring 45 of the check valve 40 overwhelms the elastic force of the centering spring 11. Accordingly, the valve body 44 of the check valve 40 disposed in the end plate 3 moves away from the valve seat 43 and thus the cylinder chamber 9 is communicated with the second fluid passage 33 via the opening 31, the interior of the valve cylinder 42, and the small-diameter hole. With the up-and-down motion of the right and left wheels and as the piston rod 7 receives a force acting in a direction to increase the volume of the cylinder chamber 10, then the piston 6 is moved towards the direction for decreasing the volume of the cylinder chamber 9 until the elastic force of the centering spring 11 in the cylinder chamber 9 overwhelms that of the return spring 45 of the check valve 40 disposed in the end plate 3, thereby seating the valve body 44 on the valve seat 43 to shut off the fluid flowing from the cylinder chamber 9 to the second fluid passage 33. This movement of the piston 6 builds up a negative pressure in the cylinder chamber 10, and accordingly the check valve 50 disposed in the end plate 4 opens to allow the flow of the fluid into the cylinder chamber 10 from the second fluid passage 34. And finally the piston 6 stops in a position where the elastic forces of the centering springs 11 and 12 which are acting on both the surfaces of the piston 6 are nearly balanced. In this piston position, the first fluid passages 20 and 21 are both blocked by the valve body 25 of the solenoid changeover valve 22; the elastic force of the centering springs 11 and 12 is greater than the elastic force of the return spring 45, or the opening 31 is closed by the flat plate sections of the plate-like members 14 and 15; each of the check valves 40 and 50 is closed to check the flow of the fluid between the cylinder chamber 9 and 10 and the second fluid passage 33 and 34. Therefore, the fluid is shut in each of the cylinder chambers 9 and 10, such that the piston 6 and the piston rod 7 can not move because of the incompressibility of the fluid even in the movement of the torsion bar 80 is transmitted to the end of the piston rod 7. (This piston position is termed the "neutral position". ) During the piston 6 is positioning in the upper part of the drawing, the stabilizer device operates similarly to the above-described when the valve body 25 is switched over to the second position.

In the stabilizer device for motor vehicles shown in FIG. 8, when the solenoid of the actuator 1 is operated to set the valve body 25 of the solenoid changeover valve 22 in the first position, the fluid is allowed to freely flow into and out of the cylinder chambers 9 and 10. Therefore, when one of the suspension arms 84 on which the free end of one of the lever-like mounting portion 82 is fixed moves up-and-down, the central spring section 81 of the torsion bar 80 may be rotated around its central axis against the support member 83. However, the piston rod 7 makes a relative motion in relation to the cylinder 5 regardless of the up-and-down movements of another suspension arms 84 on which the free end of another lever-like mounting portion 82 is fixed, therefore no torsion will occur in the central spring section 81 of the torsion bar 80, thus cancelling the anti-roll effect of the torsion bar 80. When the solenoid of the actuator 1 is operated to place the valve body 25 in the second position, and in case when the piston 6 of the actuator 1 is in the neutral position, the relative movements between the piston rod 7 and the cylinder 5 are checked regardless of the up-and-down motion of the suspension arms 84. Consequently when the right and left wheels supported by the suspension arms 84 make up-and-down motion of different phases, the central spring section 81 of the torsion bar 80 will be twisted due to the phase difference, effecting an anti-roll action. Also, in case when the piston 6 is not in the neutral position at the time when the valve body 25 is switched to the second position, the piston 6 and the piston rod 7 are prevented from moving towards increasing the amount of piston deviation from the neutral position, and accordingly the anti-roll action will be effected in the event of the up-and-down wheel motion likely to increase a difference in the position in the vertical direction of the right and left wheels. Since the piston 6 and the piston rod 7 are permitted to move in a direction to return to the neutral position, the piston 6 will automatically be returned to the neutral position by the up-and-down motion of the wheels during driving.

In the stabilizer device for motor vehicles shown in FIG. 9, when the valve body 25 of the solenoid changeover valve 22 for the actuator 1 is placed in the first position, the piston rod 7 can freely move up and down relative to the cylinder 5, since the position of the mounting member 85 is not fixed. Therefore, the central spring section 81 of the torsion bar 80 will not be twisted when the suspension arms 84 make up-and-down motion, thus cancelling the anti-roll effect. When the piston 6 of the actuator 1 is in the neutral position and the valve body 25 is switched to the second position, the piston rod 7 remains stationary relative to the mounting member 86 on the vehicle body side; therefore the up-and-down motion of the suspension arms 84 twists the central spring section 81 of the torsion bar 80, effecting the anti-roll action. Also, when the piston 6 is not positioned in the neutral position and the valve body 25 is switched to the second position, the piston 6 and the piston rod 7 are prevented from moving towards increasing the amount of piston deviation from the neutral position; the anti-roll action, therefore, will be effected against the up-and-down motion of the wheels likely to increase the positional difference of the right and left wheels in the vertical direction. Since the movement of the piston 6 and the piston rod 7 to move the piston 6 towards the neutral position is permitted, the piston 6 will automatically return to the neutral position by the up-and-down motion of the wheels during driving.

In the stabilizer device for motor vehicles shown in FIG. 10, when each of the valve body 25 of the solenoid changeover valve 22 for the actuators 1 and 1b is placed in the first position, respectively, the piston rod 7 of the actuator 1 freely moves substantially in the vertical direction, and also the piston rod 7b of the actuator 1b freely moves in the horizontal direction, cancelling the anti-roll effect, anti-dive effect and anti-squat effect of the torsion bar 80. When the valve body 25 of the solenoid changeover valve 22 for the actuator 1 is switched to the second position, a similar anti-roll action is effected by the actuator 1 as explained with respect to the actuator 1 shown in FIG. 8. Furthermore, when the piston 6 of the actuator 1b is in the neutral position and the valve body 25 of the solenoid changeover valve 22 for the actuator 1b is switched to the second position, the central spring section 81 of the torsion bar 80 is supported stationally at the central part by the mounting member 85 relative to the mounting member 86 on the vehicle body side; and accordingly the central spring section 81 is subject to torsion even when the right and left wheels make up-and-down motion in the same phase, thus effecting the anti-dive and anti-squat actions. Also when the piston 6 is not in the neutral position and the valve body 25 is switched to the second position, the piston 6 and the piston rod 7 is prevented to move in a direction to increase the amount of piston deviation from the neutral position, thus effecting the anti-roll action relating to up-and-down motion of the wheels likely to increase a positional difference in the vertical direction between the right and left wheels. Since movement of the piston 6 and the piston rod 7 to move the piston 6 towards the neutral position, the piston 6 will automatically return to the neutral position by the up-and-down motion of the wheels during driving.

Figure 4:
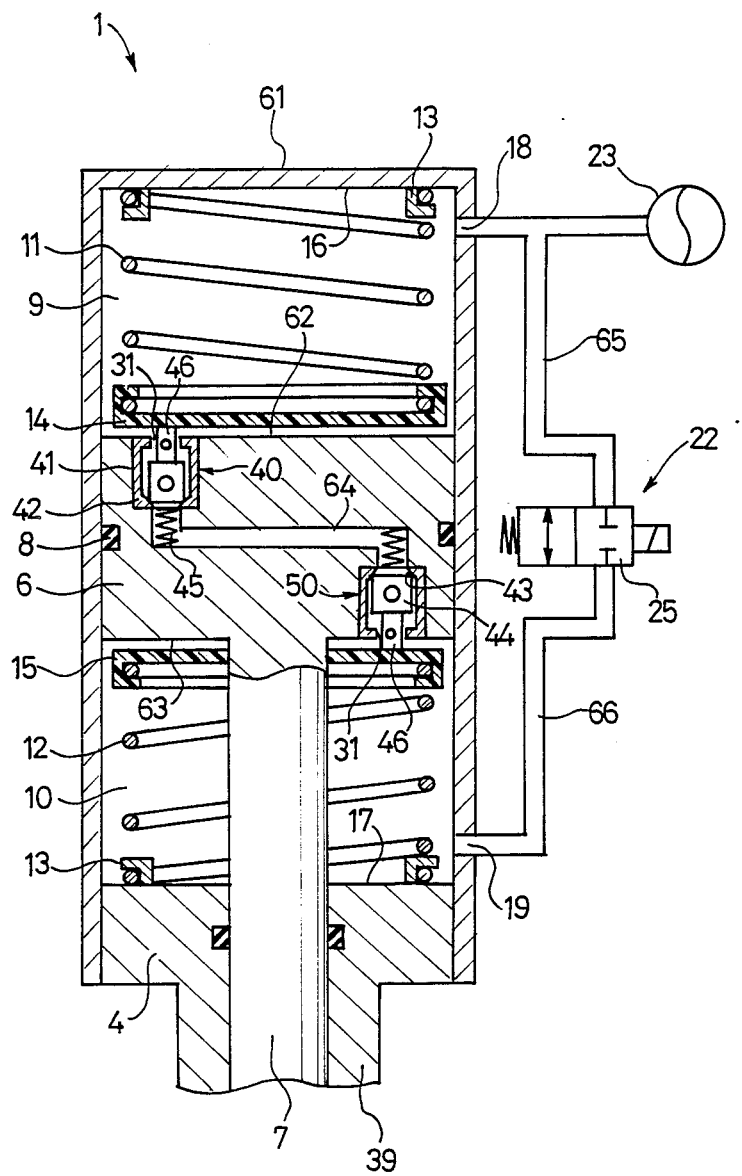
FIGS. 4 and 5 are sectional views of major portions each showing an operating condition of an actuator and a changeover means according to a second embodiment of this invention, respectively.
Figure 5:
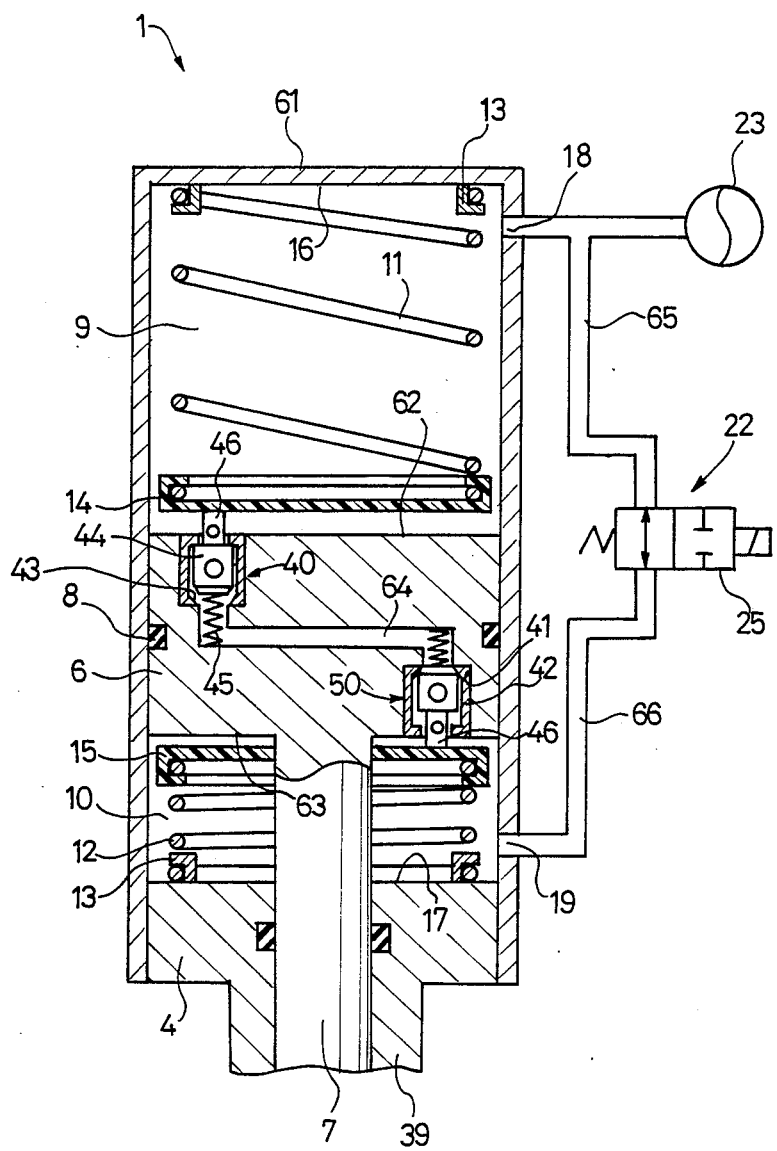

FIG. 4 is a sectional view showing a major portion of the actuator and the solenoid changeover valve as a changeover means in the second embodiment of this invention. FIG. 5 is a sectional view showing the actuator and the solenoid changeover valve in operation. According to this embodiment, the check valve and the second fluid passage explained with respect to the first embodiment are formed in the piston 6, and the same reference numerals are used for the same parts appearing in the first embodiment; the description of these parts, therefore, is omitted. Furthermore, the solenoid changeover valve 22 and its valve body 25 are schematically shown.

In this embodiment, the outer cylinder 2 of the actuator 1 constitutes a cylinder 5 formed into a bottomed cylinder closed at one end with a bottom plate 61 and secured fluid-tight with the end plate 4 at the opening section. The piston 6 is connected to one end of the piston rod 7 which is holded slidably and fluid-tightly through an opening of the end plate 4. The interior of the cylinder 5 is separated by this piston 6 into two cylinder chambers 9 and 10. In the groove cut in the outer peripheral surface of the piston 6 is installed the seal ring 8 to keep fluid-tightness between the piston 6 and the inner wall of the outer cylinder 2 like as stated with respect to the first embodiment.

The centering spring 11 and 12 disposed in the cylinder chambers 9 and 10 are concentrically secured, by a few L-shaped fittings 13, 13, at one end thereof to the cylinder wall surfaces 16 of the bottom plate 61 and the cylinder wall surface 17 of the end plate 4, respectively. The other end of the centering spring 11 and 12, respectively, are secured to the plate members 14 and 15 of rigid synthetic resin. Each of the plate members 14 and 15 has a flat plate section which is to be in contact with the piston wall surfaces 62 and 63 on both sides of the piston 6 along the movement thereof. The check valves 40 and 50 are provided, similarly in the case of the first embodiment, within the cylindrical bore 41 opening in the piston wall surfaces 62 and 63 which face the cylinder chambers 9 and 10 of the piston 6, respectively. The free end of the small-diameter end section 46 of the valve body 44 extends into the opening 31. When each of the valve body 44 is seated on the valve seat 43 by the elastic force of the centering spring 11 and 12 opposing to the elastic force of the return spring 45, the small-diameter end section 46 is either in flush with the piston wall surfaces 62 and 63 or projected by a small size from the wall surfaces 62 and 63 into the cylinder chambers 9 and 10. The small-diameter holes drilled in the piston 6 concentrically with the cylindrical bore 41 of the check valves 40 and 50 and having the return spring 45 therein are communicated with each other by a second fluid passage 64.

The openings 18 and 19 are formed in the outer cylinder 2 outside of the sliding range of the piston 6 where these openings 18 and 19 are not closed by the piston 6. These openings 18 and 19 are connected through a first fluid passages 65 and 66 which are connected or disconnected with each other by the solenoid changeover valve 22. The fluid passage 65 is communicated with the accumulator 23.

In this embodiment, similarly to the first embodiment, when the valve body 25 of the solenoid changeover valve 22 is in the first position in which both the first fluid passages 65 and 66 are communicating with each other (FIG. 5), the fluid in the cylinder chambers 9 and 10 is freely flowing through the first fluid passages 65 and 66. The piston 6 and the piston rod 7, therefore, makes a free relative movement in relation to the cylinder 5 with the movement of the torsion bar 80 which is transmitted thereto. In consequence, the anti-roll, anti-dive and anti-squat effects of the torsion bar 80 will become cancelled. However, when the valve body 25 is switched to the second position and the piston 6 is off its neutral position as shown in FIG. 5, the elastic force of the return spring 45 of the check valve 40 overwhelms that of the centering spring 11, thus the return spring 45 of the check valve 40 is extended and the valve body 44 moves away from the valve seat. In the meantime, the check valve 50 which faces to the cylinder chamber 10 whose volume is decreased caused by the compression of the centering spring 12 functions as a normal check valve, fully confining the fluid in the cylinder chamber 10. Therefore, when the movement of the central spring section 81 of the torsion bar 80 caused by the up-and-down motion of the right and left wheels is transmitted to the piston 6 through the piston rod 7, the movement of the piston 7 in a direction to further decrease the volume of the cylinder chamber 10 is checked by the uncompressibility of the fluid. The movement of the piston rod 7 in a direction to increase the volume of the cylinder chamber 10 allows the fluid to flow from the cylinder chamber 9 into the cylinder chamber 10 via the check valve 40, the second fluid passage 64 and the check valve 50, allowing the piston 6 and the piston rod 7 to move as far as the position in which the elastic forces of the center springs 11 and 12 are balanced as shown in FIG. 4. When the valve body 25 of the solenoid changeover valve 22 is in the second position at the time when the piston, is in this neutral position, the piston rod 7 remains unmoved even if the force on the torsion bar 80 is transmitted to the piston rod 7. The torsion bar 80, therefore, may make the anti-roll or anti-dive action and the anti-squat action.

Figure 6:
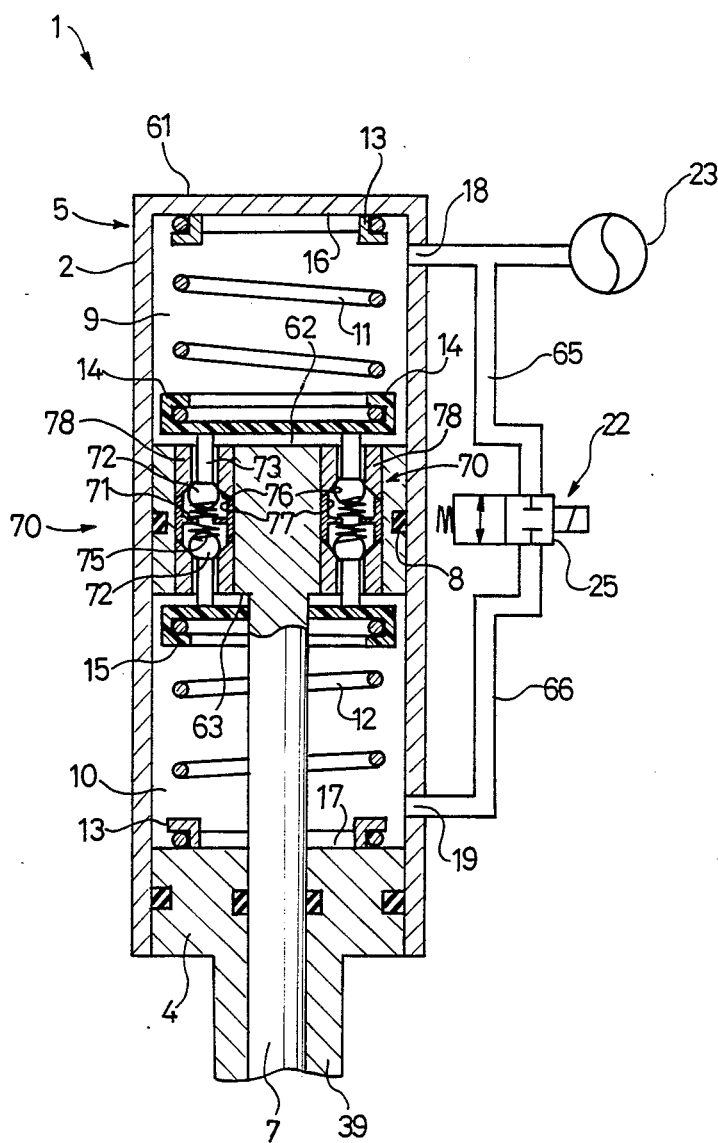
FIGS. 6 and 7 are sectional views of major portions each showing an operating condition of an actuator and a changeover means according to a third embodiment of this invention, respectively.
Figure 7:
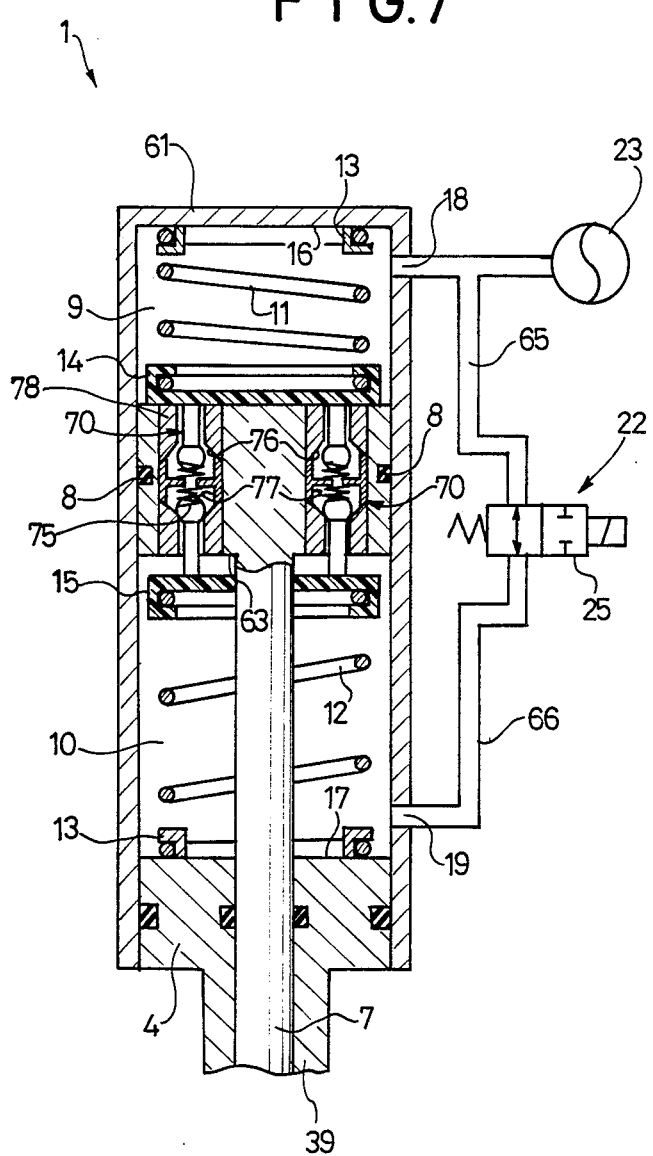

FIG. 6 is a sectional view showing a major portion of the actuator and the solenoid changeover valve as a changeover means in the third embodiment of this invention. FIG. 7 is a sectional view showing the actuator and the solenoid changeover valve in operation.

This embodiment differs only in the constitution of the check valve formed in the piston 6 and the constitution of the second fluid passage than those of the second embodiment. Other parts are the same as those of the second embodiment. Therefore, in this embodiment, only the check valve and the second fluid passage will be explained. For the constitution of other parts, the same reference numerals are used for the same parts appearing in the second embodiment, respectively, but no explanation of these parts will be given.

The check valve 70 of this embodiment comprises a cylindrical holding member 78 fixed on the periphery of a cylindrical hole formed in parallel to the axial direction of the piston 6 and having an annular spring seat 71 which is projecting from a cylindrical wall at the midpoint in the axial direction of the cylindrical holding member 78 and two valve seats 76 and ball valves 72 having valve balls each fixed at the end of each of the valve stems 73. Each of the ball valves 72 is inserted into the cylindrical inner space of the cylindrical holding member through each end opening thereof together with return spring 75 such that the valve balls of the valves 72 will face each other; and such that when each of the valve balls of the valves 72 is seated on the valve seats 76 by the return spring 75, the free end of each of the valve stems 73 is slightly projecting out of the piston wall surface into the cylinder chambers 9, 10 respectively. In this embodiment, the check valve 70 is designed to check the flow of the fluid in the opposite direction of check of fluid flow in compared with the check valves 40 and 50 in the second embodiment, therefore, the valve balls of the ball valves 72 in the check valve 70 are pressed by the elastic force of the return springs 75 to be seated on the valve seats 76, and are moved away from the valve seats 76 when the valve stems 73 are pushed by the plate-like members 13, 14 with the elastic force of the centering springs 11 and 12. Therefore, during the piston 6 is in the neutral position, the elastic force of the return spring 75, unlike the first and second embodiments, is slightly greater than that of each of the centering springs 11 and 12. In the drawing, there are provided two check valves 70. In this case, however, only one check valve 70 is effective and more than three check valves may be formed around the piston rod. The second fluid passage 77 is formed in the interior of the cylindrical holding member 78 and between two valve seats 76 of each check valve 70.

In this embodiment also, similarly to the second embodiment, when the valve body 25 of the solenoid changeover valve 22 is placed in the first position, the anti-roll, anti-dive and anti-squat effects of the torsion bar 80 are ineffective. When the valve body 25 is switched to the second position, the anti-roll or anti-dive effect and the anti-squat effect of the torsion bar 80 are accomplished.

Figure 12:
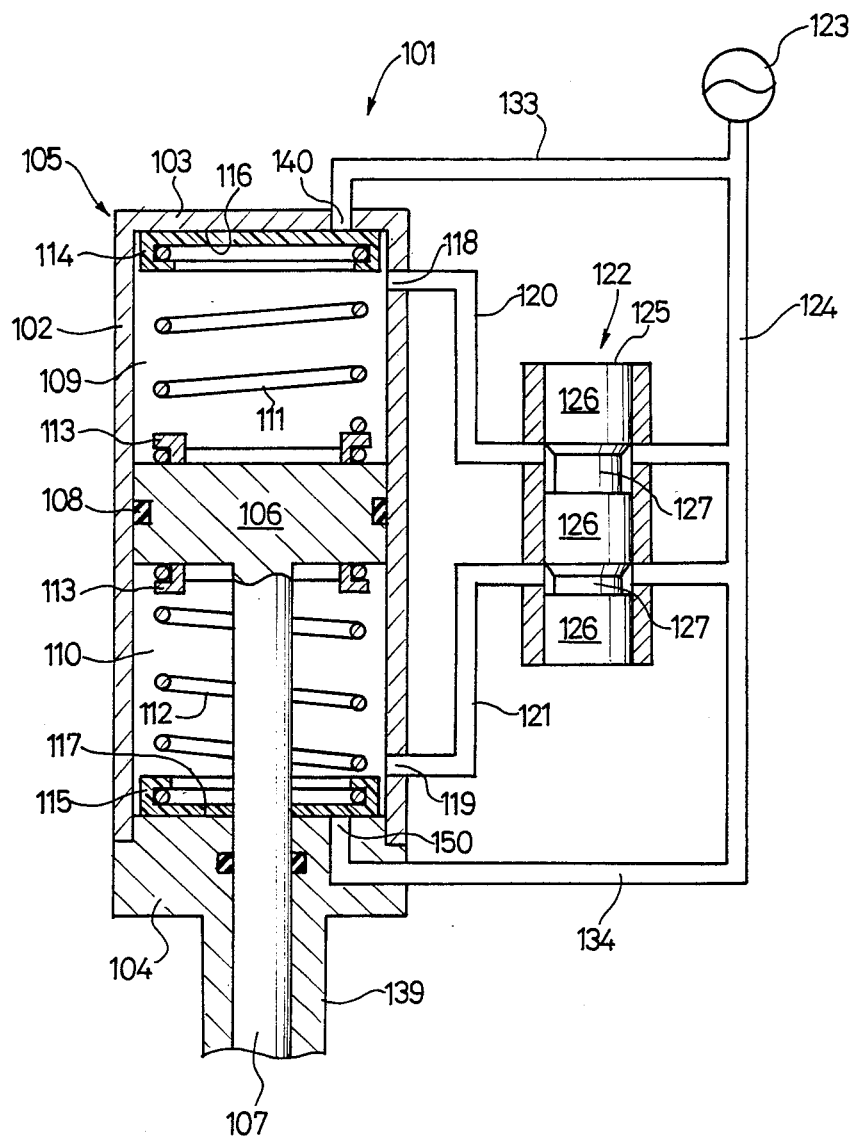
FIGS. 12 and 13 are sectional views of major portions each showing an operating condition of an actuator and a changeover means according to a fourth embodiment of this invention, respectively.
Figure 13:
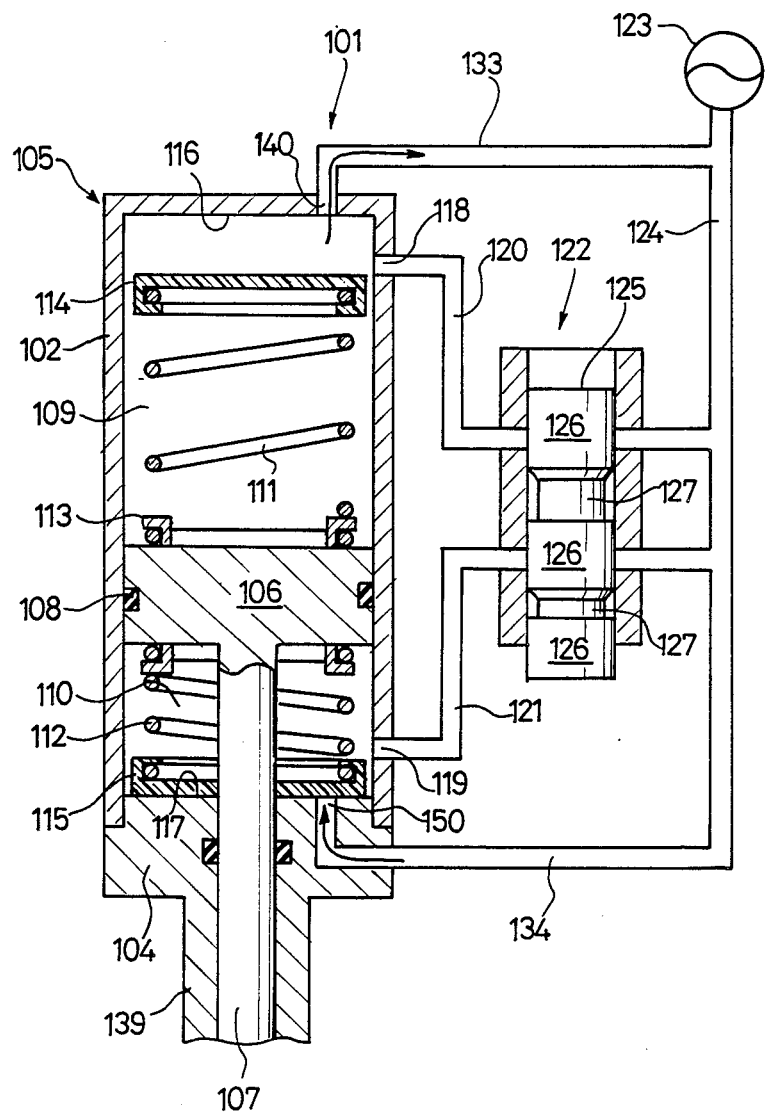

FIG. 12 is a sectional view showing a major portion of the actuator and the solenoid changeover valve as a changeover means in the fourth embodiment of this invention. FIG. 13 is a sectional view showing the actuator and the solenoid changeover valve in operation.

The actuator 101 comprises a bottomed cylinder 105 having an outer cylinder 102 with its axial one end closed with a bottom plate 103, a disk-like end plate 104 secured fluid-tightly to the opening end, a piston 106 slidable along the inner peripheral surface of the outer cylindrical 102 and movable in the axial direction of the outer cylinder 102, and a piston rod 107 passing fluid-tightly through the end plate 104 along the center axis of the outer cylinder 102 and connected at one end thereof to the piston 106. The piston 106 has a groove cut in the outer peripheral surface, in which a seal ring 108 produced of a soft, elastic material is inserted for maintaining fluid-tightness between the piston 106 and the inner wall of the outer cylinder 102, and further separates the interior of the cylinder 105 into two cylinder chambers 109 and 110.

In the cylinder chambers 109 and 110 separated by the piston 103 are disposed coil springs serving as center springs 111 and 112. One end of each of the springs 111 and 112 is concentrically fastened to the piston 106 by means of a few L-shaped fittings 113, 113 fixedly installed on the piston wall surfaces of the piston 6 facing the cylinder chambers 109 and 110. The other ends of the springs 111 and 112 are fixedly secured to the plate-like members 114 and 115 of a rigid synthetic resin, respectively, such that a flat plate section of the plate-like member 114 can be in contact with a cylinder wall surface 116 of a bottom plate 103 and facing the piston wall surface of the piston 6 on which said one end of the spring 112 is fixed and a flat plate section of the plate-like member 115 can be in contact with a cylinder wall surface 117 of the end plate 104 facing the piston wall surfaces of the piston 6 on which said one end of the spring 112 is fixed. The outer diameter of the plate-like members 114 and 115 is smaller than the inner diameter of the inner wall surface of the outer cylinder 2.

The outer cylinder 102 is provided with openings 118 and 119 outside of the sliding range of the piston 106 where these openings will not be closed by the piston 106. First fluid passages 120 and 121 communicating with the openings 118 and 119 are connected to the main fluid passage 124 connected to the accumulator 123 via a solenoid changeover valve 112. In the cylinder walls 116 and 117 of the bottom plate 103 and the end plate 104 are formed openings 140 and 150, respectively, in such a position in which the flat plate section of the plate-like members 114 and 115 comes in contact therewith, respectively. These openings 140 and 150 are connected to the main fluid passage 124 through the second fluid passages 133 and 134. The fluid is filled in the cylinder chambers 109 and 110, the first main fluid passages 120 and 121, the second fluid passages 133 and 134, the main fluid passage 124 and the accumulator 123 forming a closed circuit, and the fluid pressure is held slightly higher than the atmospheric pressure by the accumulator 123. A valve body 125 connected to the solenoid (not shown) of the solenoid changeover valve 122 has three lands 126 arranged in the axial direction and two annular grooves 127 cut in the outer peripheral surface between the lands. When the annular grooves 127 are in a position in which the first fluid passages 120 and 121 are connected to the main fluid passage 124, the first fluid passages 120 and 121 communicate with each other, allowing the free flow of the fluid from one of the cylinder chambers 109 and 110 to the other. Also, when the lands 126 have closed communication between the first fluid passages 120 and 121, fluid flow between the first fluid passages 120 and 121 is prohibited.

Length of the centering springs 111 and 112 are determined such that, when the piston 106 is in the neutral position in the cylinder 105, that is, when the piston 106 is in a position in which an axial distance X from the piston wall surface on one side of the piston 106 to the cylinder wall surface 116 of the bottom plate 103 is equal to an axial distance X from the other piston wall surface of the piston 106 to the cylinder wall surface 117 of the end plate 104, the free length of the centering springs 111 and 112 relative to the axial direction is to be 1.05 to 1.43 times, or preferably to 1.1 to 1.2 times, as long as the axial distance X. In other words, the axial distance X is determined to 70 to 95 percent, or preferably to 83 to 90 percent, of the free length relative to the axial direction of the springs 111 and 112.

Figure 11:
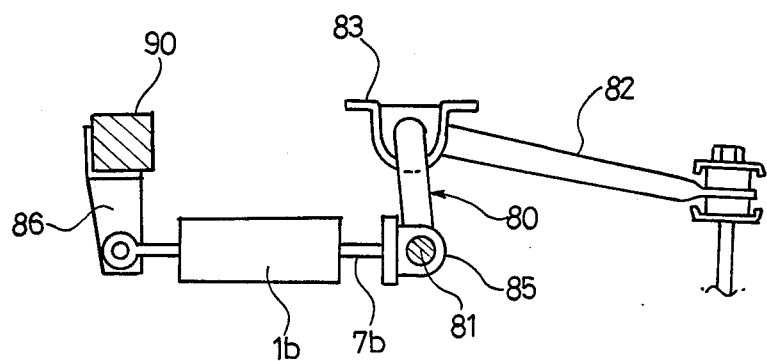
FIG. 11 is a side view, partly shown in cross-section, showing a major portion of FIG. 10.

The actuator 101, similarly to the actuator 1 explained in the first embodiment, is used in the stabilizer device for motor vehicles shown in FIG. 8. In this case, the actuator 101 is mounted between the suspension arm 84 and the lever-like mounting section 82 of the torsion bar 80. The actuator 101 is mounted in place of the actuator 1 shown in FIG. 3 in the stabilizer device for motor vehicles. The actuator 101 can also be mounted in place of the actuator 1 in the stabilizer device for motor vehicles shown in FIGS. 9 to 11.

According to this embodiment, when the valve body 125 of the solenoid changeover 122 shown in FIG. 12 is in the first position in which the first fluid passages 120 and 121 are connected to the main fluid passage 124 through the annular grooves 127 and accordingly the first fluid passages 120 and 121 are communicated with each other, the up-and-down or horizontal motion of the torsion bar 80 is transmitted to the piston rod 107. In this state, the fluid in the cylinder chambers 109 and 110 flows between these chambers freely and therefore the piston rod 107 can freely move, thus making ineffective the stabilizer action of the torsion bar 80. The free length of the centering springs 111 and 112 in this embodiment is set to 1.05 to 1.43 times larger than the axial distance X between the wall surface of the piston positioned in the neutral position to the cylinder wall surfaces 116 and 117. Therefore, as shown in FIG. 13, in the event of downward movement in a long stroke of the piston rod 107 from the neutral position of the piston, the spring 112 in the cylinder chamber 110 is compressed largely to push the plate-like member 115 with a great elastic force against the cylinder surface 117 of the end plate 104, thereby closing the opening 150 is resulted. However, the spring 111 in the cylinder chamber 109 extends to a free state and the plate-like member 114 fixed at the end of this spring 111 moves away from the cylinder wall surface 116 of the bottom plate 103, thus opening the opening 140 is resulted.

When, in this state, the solenoid (not shown) is operated to set the valve body 125 of the solenoid changeover valve 122 to the second position in which the first fluid passages 120 and 121 are disconnected from the main fluid passage 124 and also the first fluid passages 120 and 121 themselves are disconnected from each other, the fluid is fully held in the cylinder chamber 110. Therefore, when the movement of the central spring section 81 of the torsion bar 80 caused by the up-and-down motion of the right and left wheels is transmitted to the piston 06 through the piston rod 107, the movement of the piston rod 107 in a direction to further decrease the volume of the cylinder chamber 110 can be prohibited by the uncompressibility of the fluid. The movement of the piston rod 107 in a direction to increase the volume of the cylinder chamber 110 permits the fluid to flow from the cylinder chamber 109 into the main fluid passage 124 through the opening 140. With the movement of the piston 106, the plate-like member 114 comes to close the opening 140. In the meantime when there is built a high negative pressure in the cylinder chamber 110, the fluid pressure in the main fluid passage 124 applied on the plate-like member 115 leads to open the opening 150, against the elastic force of the spring 112 thus the fluid is allowed to flow into the cylinder chamber 110. The piston 106, therefore, will stop in the position where it is determined by a relationship between the pressure in the cylinder chambers 111 and 112 and the free length and elastic force of the centering spring 111 and 112. Thereafter, when the up-and-down motion or horizontal motion of the torsion bar is transmitted to the piston rod 107, the piston rod 107 will not be moved because of the uncompressibility of the fluid trapped in both the cylinder chambers 109 and 110. Therefore, the up-and-down motion of the suspension arms 84 will cause the central spring section 81 of the torsion bar 80 to twist, thus the anti-roll or anti-dive action and the anti-squat action of the torsion bar 80 can be established. The stop position of the piston 106 does not or may not always be the same position with the neutral position of the piston, but a position near the neutral position, where, despite of a positional deviation, the anti-roll or anti-dive effect and the anti-squat effect will not be adversely effected.

According to this embodiment, the stabilizer device operates similarly as described above even if the centering spring 111 in the cylinder chamber 109 is excessively compressed and the centering spring 112 in the cylinder chamber 110 is in a free extended position when the valve body 125 of the solenoid changeover valve 122 is switched to the second position.

Figure 14:
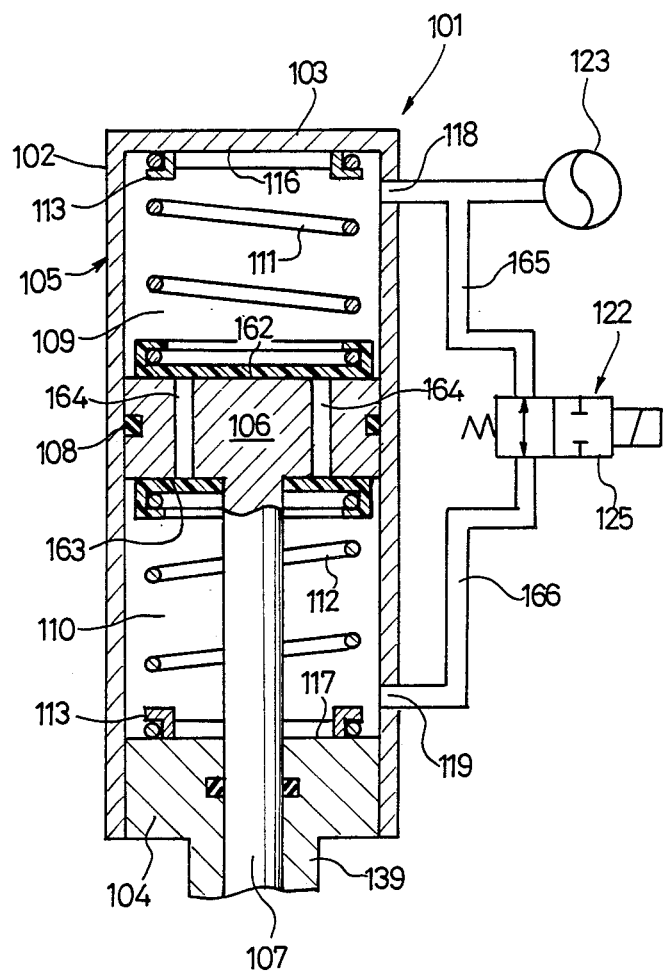
FIGS. 14 and 15 are sectional views each showing an operating condition of an actuator and a changeover means according to a fifth embodiment of this invention, respectively.
Figure 15:
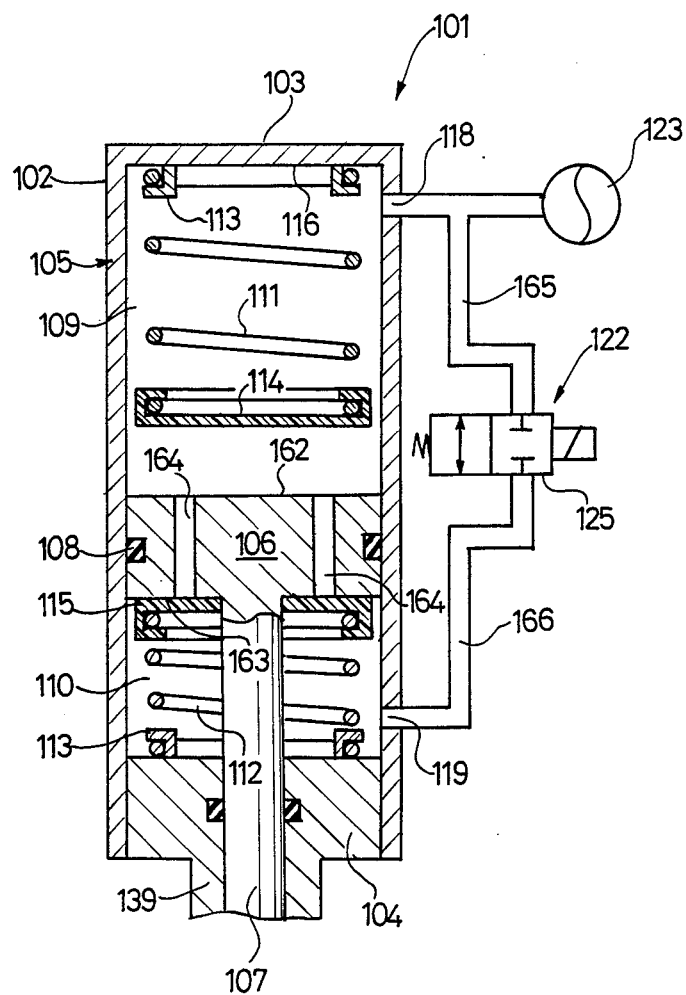

FIG. 14 is a sectional view showing a major portion of the actuator and the solenoid changeover valve as a changeover means according to the fifth embodiment of this invention. FIG. 15 is a sectional view showing the actuator and the solenoid changeover valve in operation.

In this embodiment, one end of each of the centering springs 111 and 112 that have been fixedly secured to the piston 106 as described in the fourth embodiment, is secured to each of the cylinder end surfaces 116 and 117 of the bottom plate 103 and the end plate 104, and the second fluid passage is formed in the piston 106. Therefore, the same reference numerals are used for the same parts appearing in the fourth embodiment and the description of these parts are not given. Furthermore, the solenoid changeover valve 122 and the valve piston 125 are schematically shown.

In this embodiment, the centering springs 111 and 112 disposed in the cylinder chambers 109 and 110 are fixedly secured at one end to the cylinder wall surfaces 116 and 117, respectively, concentrically with the piston 106, by a few L-shaped fittings 113, 113 attached on the cylinder wall surfaces 116 and 117 of the bottom plate 103 and the end plate 104, respectively. The plate-like members 114 and 115 produced of a rigid synthetic resin secured to the other end of the springs 111 and 112 have a smaller outer diameter than that of the piston 106. The plate-like members 114, 115 have flat plate sections which may be pressed with the elastic force of the springs 111 and 112 against the piston wall surfaces 162 and 163 on both sides of the piston 106, respectively. The piston 106 is provided on the piston wall surface 162, 163 facing each cylinder chamber 109, 110 with openings within a range where the flat plate section of the plate-like members 114, 115 are in contact therewith. These openings are formed as both openings of the second fluid passage 164 which is formed in the piston 106 in the axial direction of the piston 106 and communicating the cylinder chamber 109 with the cylinder chamber 110.

The openings 118 and 119 formed in the outer cylinder 102, outside the sliding range of the piston 106 where they are not closed by the piston 106, are connected to the first fluid passages 165 and 166 which are connected or disconnected with each other by the solenoid changeover valve 122. The fluid passage 165 is communicated with the accumulator 123.

In this embodiment, similarly to the fourth embodiment, when the valve body 125 of the solenoid changeover valve 122 is in the first position in which the first fluid passages 165 and 166 are communicated with each other (FIG. 14), the fluid in the cylinder chambers 109 and 110 is allowed to freely flow through the first fluid passages 165 and 166. Accordingly the piston rod 107 makes a relative movement in relation to the cylinder 5 with the movement of the torsion bar 80 which is transmitted to the piston rod 107, consequently making ineffective the anti-roll effect, anti-dive effect and anti-squat effect of the torsion bar 80. However, as seen from the piston position shown in FIG. 15, when the valve body 125 is switched to the second position at the time when the plate-like member 114 is moved off the piston wall surface 162 with the centering spring 112 in one cylinder chamber 110 excessively compressed and with the centering spring 111 in the other cylinder chamber 109 in a free extended condition, even if the movement of the central spring section 81 of the torsion bar 80 is transmitted to the piston 106 through the piston rod 107, the fluid is trapped in the cylinder chamber 110 and therefore the movement of the piston rod 107 in a direction to further decrease the volume of the cylinder chamber 110 is prohibited. The piston rod 107, however, can be moved in a direction to increase the volume of the cylinder chamber 110, increasing the fluid pressure in the cylinder chamber 109 to allow the fluid to flow into the cylinder chamber 110 through the second fluid passage 164. Therefore, the piston 106 returns to or near to the neutral position and the two plate-like members 114 and 115 are pressed into contact with the piston wall surfaces 162 and 163 of the piston 106, trapping the fluid in both the cylinder chambers 109 and 110 to check the movement of the piston rod 107. In consequence, the torsion bar 80 is caused to perform anti-roll or anti-dive action and anti-squat action. These actions are similar to those described in the fourth embodiment.

What is claimed is:

1. A stabilizer device for a motor vehicle comprising,
    a torsion bar having a central spring-action section extending transversely in the direction of width of the vehicle body and two mounting sections each extending from the both ends of said central spring-action section in the longitudinal direction of the vehicle body, one of said central spring-action section and mounting sections being mounted on a mounting member fixed on said vehicle body side and the other being mounted on a mounting member fixed on a wheel side,
    an actuator provided between at least one of said mounting members and a portion of said torsion bar which makes relative movement in relation to said one of the mounting members result from up-and-down movement of a wheel, said actuator including a cylinder, a piston slidably movable in said cylinder and separating the interior of said cylinder into two cylinder chambers and a piston rod for transmitting said relative movement to the relative movement of said piston relative to said cylinder,
    a closed circuit formed by providing fluid passages and filled with fluid including two first fluid passages with one end of each passages opening in one of said two cylinder chambers of said actuator, respectively, a change-over means disposed in said closed circuit for changing-over between a state in which the flow of the fluid is allowed between said two first fluid passages and a state in which the flow of the fluid between two first passages is prohibited,
    said actuator having a spring means in each of said cylinder chambers, a first end of said spring means, respectively, being fixed to one of wall surfaces facing respective cylinder chambers between the piston wall surface and the cylinder wall surface facing said piston wall surface in relation to the direction of movement of said piston, a second end of said spring means, respectively, being fixed to a plate member which is smaller in size and shape than the size and shape of the other wall surface between said piston wall surface and cylinder wall surface, thereby resilience of said spring means is exerted on said plate member to a direction toward said other wall surface, said other wall surface, respectively, having an opening within an area on which said plate member is to come in contact therewith by the resilience of said spring means for communicating respective cylinder chamber with a second fluid passage which forms a part of said closed circuit, and a check valve being disposed in said opening, a valve body of said check valve being positioned such that said valve body is unseated from a valve seat and a part thereof is constantly contacted with said plate member by virtue of the resilience of a return spring provided in said check valve, and said valve body is seated on the valve seat for closing said second fluid passage when said valve body is pushed by said plate member against the resilience of said return spring, the resilience of said spring means positioned in each of cylinder chambers being a little greater than the resilience of each of said return spring provided in said check valve, respectively, which is exerted to a direction opposite to that of said spring means when said piston is positioned in a neutral position at which position the resilience of both spring means are equilibrated.

2. A stabilizer device according to claim 1, wherein each of said spring means is fixed at said first end thereof to said piston wall surface of said piston facing said cylinder chamber of said actuator and is fixed at said second end thereof to said plate member, the resilience of said spring means is exerted on said plate member to the direction toward said cylinder wall surface facing said piston wall surface in relation to the direction of movement of said piston, and each of said check valves is disposed in the respective opening formed on said cylinder wall surface for communicating said second fluid passage and respective cylinder chamber.

3. A stabilizer device according to claim 1, wherein said second fluid passage is formed in said piston with said openings opening on said piston wall surfaces, respectively, for communicating said second fluid passage with said cylinder chambers, each of said check valves is disposed in said respective opening, each of said spring means is fixed at first end thereof to said cylinder wall surface facing to said piston wall surface in relation to the relative movement of said piston and at said second end thereof to said plate member, the resilience of said spring means is exerted on said plate member to the direction toward said piston wall surface, respectively.

4. A stabilizer device for a motor vehicle comprising, a torsion bar having a central spring-action section extending transversely in the direction of width of the vehicle body and two mounting sections each extending from the both ends of said central spring-action section in the longitudinal direction of the vehicle body, one of said central spring-action section and mounting sections being mounted on a mounting member fixed on said vehicle body side and the other being mounted on a mounting member fixed on a wheel side, an actuator provided between at least one of said mounting members and a portion of said torsion bar which makes relative movement in relation to said one of the mounting members resulted from up-and-down movement of a wheel, said actuator including a cylinder, a piston slidably movable in said cylinder and separating the interior of said cylinder into two cylinder chambers and a piston rod for transmitting said relative movement to the relative movement of said piston relative to said cylinder, a closed circuit formed by providing fluid passages and filled with fluid including two first fluid passages with one end of each passages opening in one of said two cylinder chambers of said actuator, respectively, a change-over means disposed in said closed circuit for changing-over between a state in which the flow of the fluid is allowed between said two first fluid passages and a state in which the flow of the fluid between said two first passages is prohibited, said actuator having a spring means in each of said cylinder chambers, a first end of said spring means, respectively, being fixed to one of wall surfaces facing respective cylinder chambers between the piston wall surface and the cylinder wall surface facing said piston wall surface in relation to the direction of movement of said piston, a second end of said spring means, respectively, being fixed to a plate member which is smaller in size and shape than the size and shape of the other wall surface between said piston wall surface and cylinder wall surface, thereby resilience of said spring means is exerted on said plate member to a direction toward said other wall surface, said other wall surface, respectively, having an opening within an area on which said plate member is to come in contact therewith by the resilience of said spring means for communicating respective cylinder chamber with a second fluid passage which forms a part of said closed circuit, each of said spring means having a resilience to close said second fluid passage by pressing said plate member into contact with said other wall surface facing to said one wall surface in relation to the relative movement of said piston when said piston is positioned in a neutral position, and a length to allow one of both spring means to extend to a free length thereof when said piston has moved by a predetermined distance from said neutral position while compressing the other spring means.

5. A stabilizer device according to claim 4, wherein each of said spring means is fixed at said first end thereof to said piston wall surface of said piston facing said cylinder chamber in said actuator and at said second end thereof to said plate member, and said second fluid passage includes passages each having an end thereof opening in each of said cylinder wall surface, both of which are positioned on the opposite positions in relation to the movement of said piston and the other end therof communicating with a fluid passage forming said closed circuit.

6. A stabilizer device according to claim 4, wherein said second fluid passage is formed in said piston with an opening opening in each of said piston wall surface, respectively, for communicating said second passage with both said cylinder chambers, each of said spring means is fixed at said first end thereof to said cylinder wall surface facing to said piston wall surface in relation to the relative movement of said piston and at said second end thereof to said plate member for pressing said plate member in contact with said piston wall surface to close said opening of said second fluid passage.

* * * * *